United States Patent [19]

Rathje

[11] 4,161,681

[45] Jul. 17, 1979

[54] PRIME MOVER, METHOD OF OPERATING SUCH AND CIRCUIT

[75] Inventor: William C. Rathje, Clinton, Iowa

[73] Assignee: General Electric Company, Fort Wayne, Ind.

[21] Appl. No.: 778,335

[22] Filed: Mar. 17, 1977

[51] Int. Cl.$^2$ .............................................. H02P 1/44
[52] U.S. Cl. .................................... 318/783; 318/792; 361/24; 361/31
[58] Field of Search ........... 318/221 E, 221 H, 221 R, 318/229, 221 C, 221 A, 783, 790, 792; 361/31, 32, 24

[56] References Cited

U.S. PATENT DOCUMENTS 2,320,252  5/1943  Vaughan .......................... 318/221 A

Primary Examiner—Gene Z. Rubinson
Attorney, Agent, or Firm—Joseph E. Papin

[57] ABSTRACT

A prime mover adapted for energization to a preselected speed therefor across a power source. The prime mover has a pair of winding means for excitation so as to effect the energization of the prime mover generally to the preselected speed when it is energized across the power source. Means is provided in circuit relation with one of the winding means and the power source for inhibiting the excitation of the one winding means generally as the prime mover attains its preselected speed, and means is operable generally in response to the occurrence of a preselected condition with respect to the excitation of the other of the winding means for placing the inhibiting means in open circuit relation with the power source generally as the prime mover attains its preselected speed.

A method of operating a prime mover, a method of interrupting the operation of means for inhibiting current flow therethrough, and a circuit are also disclosed.

46 Claims, 8 Drawing Figures

PRIME MOVER, METHOD OF OPERATING SUCH AND CIRCUIT

FIELD OF THE INVENTION

This invention relates generally to prime movers and in particular to such prime movers having auxiliary starting devices, a method of operating a prime mover, a method of interrupting the operation of means for inhibiting current flow, and a circuit.

BACKGROUND OF THE INVENTION

In the past, various types of prime movers, such as dynamoelectric machines or electric motors for instance, were provided with a winding circuit in a stationary assembly, such as a stator or the like, having parallel connected main or run winding means and an auxiliary or start winding means. During a starting mode of these past types of prime movers, the winding circuit thereof was initially connected across a power source or line by suitable operator operated switching means to effect the generally conjoint excitation of the main winding means and the start winding means at least until a rotatable assembly magnetically associated with the main winding means and the auxiliary winding means of the stationary assembly was energized generally to a preselected speed. Of course, various prior art mechanisms or devices were utilized to render the auxiliary winding means ineffective in the winding circuit generally when the preselected speed of the prime mover, i.e., the rotatable assembly thereof, was attained.

Some of these prior art devices for controlling the excitation of the auxiliary winding means were mechanical speed responsive devices. For instance, when the rotatable assembly attained the preselected speed, a centrifugal mechanism carried on the rotatable assembly was actuated to move an associated collar generally axially on the rotatable assembly from an at-rest position toward another position, and upon such axial movement to its another position, the collar drove linkage means for operating a switch which effected the de-excitation of the auxiliary winding means by disconnecting it from the power source. Thus, with the auxiliary winding means rendered ineffective in the winding circuit, the prime mover then was energized generally at the preselected speed thereof in response to the continued excitation of the main winding means. Of course, at least one of the disadvantageous or undesirable features of the aforementioned centrifugal mechanism and associated linkage means is believed to be those well-known limitations attributable to most all mechanical devices, such as tolerance problems, wear problems, noise problems and, in some instances reliability problems.

In other types of these prior art prime movers, a current relay was employed for controlling the excitation of the auxiliary winding means. For instance, a coil of the current relay was serially connected in the winding circuit with the main winding means thereof, and contact means of the current relay was serially connected in the winding circuit with the auxiliary winding means thereof. When the prime mover was energized across the line, as previously mentioned, the coil of the current relay and the main winding means were excited, and the excitation of the relay coil effected the magnetic closure of the contact means of the relay so as to effect the excitation of the auxiliary winding means; therefore, in this manner, the main winding means and the auxiliary winding means were conjointly excited to energize the prime mover to generally its preselected speed during a starting mode thereof. Of course, when the prime mover was so energized generally to its preselected speed, the current draw of the main winding means was appreciably reduced, and such reduction of current caused the relay coil to weaken its magnetic affect thereby to permit the contact means of the current relay to return to their at-rest or open position. Thus, with the relay contacts so opened to interrupt current flow to the auxiliary winding means, the auxiliary winding means were rendered ineffective generally at the time the prime mover attains its preselected speed, and the prime mover remained energized generally at the preselected speed thereof during its running mode in response to the continued excitation of the main winding means. At least one of the disadvantageous or undesirable features of such past prime movers utilizing a current relay for controlling excitation of the auxiliary winding means is believed to be that the contact means of the current relay had a tendency to weld in response to the generally large current draw by the auxiliary windings during the starting operation of the prime mover. Another disadvantageous or undesirable feature is believed to be that the current relay generated radio and television interference at the instant of make and break due to arcing of the contact means.

In the event a capacitor was utilized in series circuit relation with the auxiliary winding of the aforementioned prime mover utilizing the current relay, the starting torque of the such prime mover may be increased wherein the capacitor may limit the amount of current in the auxiliary winding to a safe value while electrically shifting its phase. Again, however, the aforementioned disadvantage or undesirable feature is believed to be that the allowable magnitude of the current drawn by the auxiliary winding is limited by the relay contact means to resist welding which may occur when the capacitor is discharged directly through the relay contact means during the starting operation of the prime mover. For instance, if the relay contact means make, break and remake during the starting operation of the prime mover, the capacitor may be charged to a peak voltage value, disconnected, and then reconnected one hundred eighty electrical degrees (180°) later to a peak opposite polarity line. Thus, the resultant discharge is at double peak value. It is also believed that the use of a relatively large capacitor, for maximum starting torque of the aforementioned prime mover utilizing a current relay, may also be impracticable generally for the same reasons as discussed above.

Another one of the prior art devices for controlling the excitation of the auxiliary winding means was a positive temperature coefficient resistor (PTCR) which was connected in series with the auxiliary winding of the prime mover. When the prime mover was energized across the line, the main winding means and auxiliary winding means were initially conjointly excited since the PTCR exhibited little initial resistance to current flow to the auxiliary winding means. The PTCR acts generally as a low value resistor until its internal temperature reaches its "Curie" point or an anomaly temperature at which time its resistance increases abruptly along with an increase of its temperature. Therefore, the temperature of the PTCR was increased in response to current flow therethrough to the auxiliary winding means during the starting operation of the prime mover, and generally at the time the prime mover attained its preselected speed, the resistance of the PTCR abruptly increased to a value appreciably limiting current flow therethrough. Thus, the auxiliary winding means was, in effect, rendered generally ineffective in the winding circuit generally at the time the prime mover attained its preselected speed, and the prime mover remained energized generally at the preselected speed thereof in response to the continued excitation of the main winding means. Of course, so long as the PTCR is energized, it will remain "hot" exhibiting a high resistance to current flow, and it is believed that, under certain conditions, this may be a disadvantageous or undesirable feature. For instance, if for some reason the prime mover had not been energized to the preselected speed so that the torque of the main winding means alone would sustain such preselected speed, then the prime mover would stall to zero speed and remain there since the PTCR would, in effect, block current flow to the auxiliary winding means. If an overload protection system of the prime mover did not alleviate the aforementioned stalled condition or locked rotor condition of the prime mover or if such overload protection system did not reset itself before the PTCR had time to cool, this stalled condition of the prime mover would be perpetuated.

In the event the winding circuit of the prime mover was provided with run and/or start capacitors so that the PTCR was subjected to continuous voltage stress, it is believed that at least one disadvantageous or undesirable feature of this arrangement is that the PTCR may be subjected to voltage stress which may exceed the oversurface break down characteristic of the PTCR; therefore, as a result of this situation, it may have been necessary to provide the PTCR with a rather complicated and expensive external insulation system to inhibit such oversurface break down characteristics which, of course, is also believed to be a disadvantageous or undesirable feature.

In addition to the foregoing, if "heat sinks", such as metallic fins or other metal masses or the like, were employed in conjunction with the PTCR to hasten its recovery after it has been deenergized, it is believed that the PTCR was subjected to thermal stressing having a capacity to physically deteriorate or destroy the PTCR which is, of course, also believed to be a disadvantageous or undesirable feature.

SUMMARY OF THE INVENTION

Among the several objects of the present invention may be noted the provision of an improved prime mover, an improved circuit, an improved method of operating a prime mover, and an improved method of interrupting the operation of means for inhibiting current flow which overcome at least some of the above discussed disadvantageous or undesirable features, as well as others, of the prior art; the provision of such improved prime mover, circuit and methods in which desirable starting characteristics of the prime mover may be attained along with maximum running efficiency therefor; the provision of such improved prime mover, circuit and methods in which optimum sized capacitors may be employed with the prime mover; the provision of such improved prime mover, circuit and methods in which energy losses are conserved; the provision of such improved prime mover, circuit and methods in which a current relay and a PTCR are combined in such a manner as to overcome at least some of the inherent limitations of both such devices; and the provision of such improved prime mover, circuit and methods in which the components thereof are simplistic, easily assembled or connected, and economically manufactured. These as well as other objects and advantageous features of the present invention will be in part apparent and in part pointed out hereinafter.

In general, a prime mover in one form of the invention is adapted for energization to a preselected speed therefor across a power source, and the prime mover has at least a pair of winding means for excitation to effect the energization of the prime mover generally to the preselected speed when it is energized across the power source. Means is associated with one of the winding means and energized with the prime mover across the power source for inhibiting the excitation of the one winding means generally as the prime mover attains its preselected speed, and means is operable generally in response to a preselected condition associated with the excitation of the other of the winding means and indicative of the occurrence of the preselected speed of the prime mover; for efecting the deenergization of the inhibiting means generally as the prime mover attains its preselected speed.

Also in general and in one form of the invention, a circuit is provided for effecting the energization of a prime mover to a preselected speed therefor across a power source. In this circuit, a pair of parallel circuit branches are adapted for connection across the power source, and the prime mover includes main winding means and auxiliary winding means respectively connected in the circuit branches for excitation to effect the energization of the prime mover to its preselected speed. Means associated with one of the circuit branches is operable generally for inhibiting current flow therethrough to the auxiliary winding means generally as the prime mover attains its preselected speed, and means is operable generally in response to a preselected condition occurring in the other of the circuit branches when the prime mover attains its preselected speed for opening the one circuit branch across the power source to interrupt the operation of the inhibiting means.

Further in general, a method is provided on one form of the invention for operating a prime mover having at least a pair of winding means adapted for excitation across a power source during a starting mode energization of the prime mover and with at least one of the winding means of the at least winding means pair adapted for excitation across the power source during a running mode energization of the prime mover. In this method, a means for inhibiting current flow therethrough to the other of the winding means of the at least winding means pair is energized so as to terminate the starting mode energization of the prime mover, and the continued excitation of the at least one winding means is effected across the power source during the running mode energization of the prime mover. The inhibiting means is placed in open circuit relation with respect to the power source during the running mode energization of the prime mover to effect the deenergization of the inhibiting means.

Still in general and in one form of the invention, there is provided a method of interrupting the operation of means for inhibiting current flow therethrough to one of at least a pair of winding means of a winding circuit in a prime mover generally upon the energization thereof to a preselected speed in response to the excitation of the winding circuit across the power source.

This method comprises sensing a preselected condition in the winding circuit generally indicative of the occurrence of the preselected speed of the prime mover and opening a circuit between the prime mover and the one winding means to effect the interruption of the operation of the inhibiting means generally as the prime mover is energized to its preselected speed.

BRIEF DESCRIPTION OF THE DRAWINGS

Corresponding reference characters indicate corresponding parts throughout the several views of the drawings.

The exemplifications set out herein illustrate the preferred embodiments of the present invention in one form thereof, and such exemplifications are not to be construed as limiting in any manner the scope of the invention or the disclosure thereof.

DETAILED DESCRIPTION OF THE PREFERRED EMBODIMENTS

Referring now to the drawings in general, there is illustrated in one form of the invention a method of operating a prime mover, such as for instance a dynamoelectric machine or electric motor indicated at 11, 13, 15, 17 respectively or the like, having at least a pair parallel connected winding means, such as for instance main winding means 27 and auxiliary winding means 29 or the like, adapted for excitation in circuit relation across a power source, such as for instance line terminals L1, L2 or the like, during a starting mode operation of the prime mover to effect the energization of the prime mover to a preselected speed therefor (FIGS. 1-8). In this method, excitation of auxiliary winding means 29 is inhibited or otherwise interrupted or terminated generally as prime mover 11-17 attains its preselected speed when it is energized across power source L1, L2. Then, auxiliary winding means 29 is placed in open circuit relation with respect to power source L1, L2 so that prime mover 11-17 is energized in a running mode with at least main winding means 27 excited to continue the energization of prime mover 11-17 in the running mode thereof across the power source.

Figure 1:
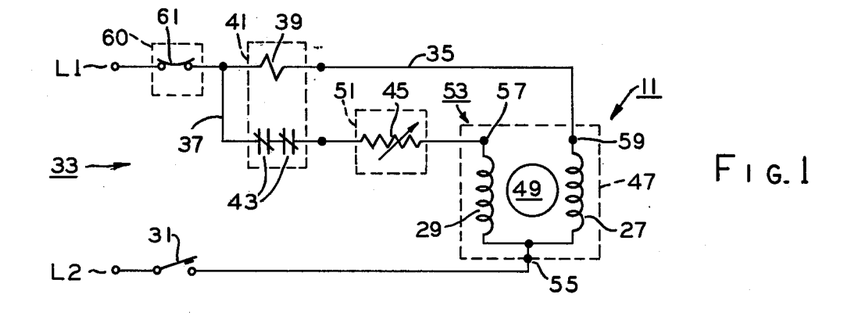
FIGS. 1-8 are schematic diagrams respectively showing a prime mover and a circuit therefor each in one form of the invention and illustrating principles which may be employed in practicing a method of operating a prime mover and a method of interrupting the operation of means for inhibiting current flow also in one form of the invention, respectively.

More particularly and with specific reference to FIG. 1, an on-off type switch 31 is connected in a circuit, indicated generally at 33, for placing or connecting prime mover 11, such as a resistance start induction run type electric motor for instance, across power source L1, L2. When switch 31 is moved to its closed or on position by an operator to effect the starting operation, mode or time period of prime mover 11, main winding means 27 and auxiliary winding means 29 thereof are excited in circuit relation with the power source. When prime mover 11 is so energized across power source L1, L2 so as to initiate the starting mode of the prime mover, a rather high current is initially drawn through one of a pair of parallel connected branches 35, 37 of circuit 33 in response to the excitation of main winding means 27, and the circuit branches are respectively associated or connected with main winding means 27 and auxiliary winding means 29. A coil 39 of a current relay device 41 is sensitive or responsive to the initial rather high current draw by main winding means 27 to magnetically effect the closure of contact means, such as contact pairs 43 of the relay device, in circuit branch 37 to effect the flow or draw of current therethrough to auxiliary winding means 29 so as to excite it generally simultaneously with the excitation of the main winding means.

A solid state means, such as for instance a positive temperature coefficient resistor 45 or the like (hereinafter referred to as a PTCR), has a characteristic of increasing its temperature in response to current flow therethrough, and when the temperature attains a "Curie" point or anomaly point, the resistance of the PTCR increases abruptly from a generally low value to a value which, in effect, throttles or inhibits the flow of current through the PTCR. Of course, the current flow inhibiting or throttling effect of PTCR 45 may be timed so as to generally coincide with the attainment of the preselected speed by prime mover 11 upon the initiation of the starting mode or operation thereof, as described above. Therefore, when relay contact means 43 are closed, PTCR 45 is energized in response to current drawn through circuit branch 37 in response to the excitation of auxiliary winding means 29, and upon such energization, the resistance of the PTCR is increased to a value great enough to inhibit, i.e. in effect to reduce to a generally insignificant value, the current flow therethrough to the auxiliary winding means generally when prime mover 11 is energized to its preselected speed. In this manner, the current flow inhibiting action of PTCR 45 renders auxiliary winding means 29 generally ineffective or unexcited when prime mover 11 attains its preselected speed generally at the end of the starting period or operation thereof, and when the auxiliary winding means is thus rendered generally ineffective, main winding means 27 remains excited in circuit relation with power source L1, L2 so as to continue the energization of prime mover 11 at its preselected speed during the running operation, mode, or period thereof.

When the running mode of prime mover 11 is thus effected at the preselected speed thereof, the current draw by the excitation of main winding means 27 is, of course, appreciably reduced, and relay device 41 or coil 39 thereof senses or is responsive to such reduction of current draw or current flow in circuit branch 35. Upon sensing the reduced current flow, relay device 41 drops out, i.e. acts to effect the opening of its contact means 43 in circuit branch 37, so as to place auxiliary winding means 29 in open circuit relation with respect to power source L1, L2. Further, the aforementioned opening of relay contact means 43 also effects the deenergization of PTCR 45 thereby to permit the cooling thereof in anticipation of a subsequent starting operation of prime mover 11. Of course, in order to effect the deenergization of prime mover 11 so as to terminate the running mode thereof, switch 31 may be manually moved to its open position thereby to break circuit 33 across power source L1, L2.

Referring again to the drawings in general and recapitulating at least in part with respect to the foregoing, prime mover 11-17 in one form of the invention is adapted for energization to at least the preselected speed across power source L1, L2 during a starting mode and thereafter in a running mode, and main winding means 27 and auxiliary winding means 29 of the prime mover are adapted for excitation so as to effect the energization of the prime mover (FIGS. 1-8). In combination with prime mover 11-17, means, such as for instance a starting device 51 or the like including PTCR 45, is operable generally during the starting mode operation of the prime mover 11-17 for inhibiting the excitation of auxiliary winding means 29 generally when the preselected speed of prime mover 11-17 is attained, and means, such as for instance relay device 41 or the like, is operable generally or actuated upon the occurrence of a preselected condition associated with main winding means 27 for rendering the inhibiting means or starting device deenergized or disabled, i.e. for effecting the deenergization of PTCR 45, when the preselected speed of the prime mover is attained so that excitation of at least the main winding means is continued during the running mode of the prime mover (FIGS. 1-8).

More particularly and with specific reference to FIG. 1, prime mover 11 has a stationary assembly, such as for instance at least a stator 47 or the like, and a rotatable assembly, such as for instance at least a rotor 49 or the like, adapted to be rotatably mounted in the stationary assembly. Main winding means 27 and auxiliary winding means 29 are wound or otherwise disposed on stationary assembly 47 in phase relation, i.e. spaced apart a predetermined number of electrical degrees for starting torque purposes, so as to define a winding circuit 53 for the prime mover, and rotatable assembly 47 is rotatably driven in the stationary assembly in magnetic coupling relation with the main winding means and the auxiliary winding means upon the excitation thereof when prime mover 11 is energized across power source L1, L2. One of a pair of opposite lead out or terminal connection ends or end portions of main winding means 27 and auxiliary winding means 29 are respectively connected together in parallel circuit relation with a prime mover terminal 55, and the other of the opposite lead out end portion pairs of the main winding means and the auxiliary winding means are respectfully connected with another pair of prime mover terminals 57, 59.

Of course, prime mover terminals 55, 57, 59 may be disposed for external connection across power source L1, L2 in any one of a plurality of constructions. For instance, terminals 55, 57, 59 may be mounted to a terminal board (not shown) either interiorly of prime mover 11, or may be accessible through a conduit box, or the like, or in the case of an "open" motor or the like, such terminals are readily accessible. Further, if prime mover 11 is a hermetic-type which may be hermetically sealed within a casing or jacket of a prime mover driven mechanism, such as a compressor or the like for instance, then prime mover terminals 55, 57, 59 may be male terminals clustered together in a Fusite plug or the like (not shown) mounted in such jacket so as to be accessible exteriorly thereof. Depending upon the type and arrangement of terminals 55, 57, 59 utilized in prime mover 11, relay device 41 and starting device 51 may be electrically interconnected with each other and terminals 57, 59 by a plurality of leads having quick connect or disconnect fittings (not shown) so as to be "hung" from prime mover 11 on such lead plurality. Alternatively, relay device 41 and starting device 51 may be plugged into each other in a so-called "piggyback" mounting arrangement with one of the relay device and starting device being plugged onto terminals 57, 59. Of course, this "piggyback" mounting arrangement of relay device 41 and starting device 51 may also be "hung" onto prime mover 11 by the electrical leads having quick connect fittings, as previously mentioned. It is contemplated that various other mounting arrangements may be utilized to mount relay device 41 and starting device 51 to prime mover terminals 57, 59 within the scope of the invention so as to meet the objects thereof.

Relay device 41 may be a current relay, such as model 3ARR12 available from the General Electric Company, Morrison, Ill. Coil 39 of relay device 41 is serially connected between line terminal L1 and prime mover terminal 59, and upon energization of prime mover 11 across power source L1, L2 upon the manual closure of switch 31, as previously discussed, the relay coil senses or is operated or energized in response to the current draw of main winding means 27 to magnetically effect the movement of contact means 43 of the relay device to their closed position in circuit branch 37. Since relay contact means 43 are serially connected between line terminal L1 of power source L1, L2 and starting device 51, the actuation or operation of relay device 41 to effect the closure of its contact means 43 in response to current draw through relay coil 39 effects the energization of starting device 51 which is serially connected between the relay contact means and prime mover terminal 57. Of course, the excitation of relay coil 39 when prime mover 11 is initially placed across power source L1, L2 is in response to a preselected current draw referred to as the pick-up calibration of relay device 41, and the relay coil is, of course, deenergized in response to a preselected low current draw referred to as the drop-out calibration of the relay device. Of course, the low current draw or drop-out current which relay coil 39 senses or is operated in response to generally defines the aforementioned preselected condition, as discussed in greater detail hereinafter. If greater details of the operation and/or construction of relay device 41 is desired, reference may be had to U.S. Pat. No. 3,130,284 issued to Lee O. Woods on April 21, 1964 which is specifically incorporated herein by reference. Of course, it is contemplated that devices other than relay device 41 may be utilized in the present invention so as to meet at least some of the objects and advantageous features thereof.

Starting device 51 connects its PTCR 45 in series circuit relation between contact means 43 of relay device 41 and prime mover terminal 57; therefore, as previously mentioned, the resistance of PTCR in response to the current applied thereto from power source L1, L2 through the closed relay contact means 43 causes the PTCR to heat during the initial stages of the current flow therethrough, i.e. during the starting operation or period of prime mover 11. When PTCR 45 is so heated to its "Curie" point temperature or anomaly temperature, its resistance abruptly increases in opposition to current flow therethrough. Of course, upon attaining the anomaly temperature, the high resistance of PTCR 45 does not block further current flow but instead limits it to a value which is low enough to, in effect, render auxiliary winding means 29 ineffective or disabled in winding circuit 53 of prime mover 11. If greater details of the operation and/or construction of starting device 51 is desired, reference may be had to the Lee O. Woods et al. application Ser. No. 761,584 filed Jan. 24, 1977 which is specifically incorporated herein by reference. Of course, it is contemplated that devices other than starting device 51 may be utilized in the present invention so as to meet at least some of the objects and advantageous features thereof.

To complete the description of prime mover 11 and its associated components, an overload protector device 60 which includes a current carrying thermal responsive switch or switch means 61, such as a bimetal element for instance, may be connected in series relation between circuit branches 35, 37 and line terminal L1. In the event of a current overload situation in the operation of prime mover 11, protector device 61 is responsive to a preselected thermal condition which accompanies such current overload to open circuit means 33 thereby to interrupt the energization of prime mover 11 across the line. Upon cooling, protector device 61 will effect the reenergization of prime mover 11 across power source L1, L2 assuming, of course, that the overload situation has been alleviated. Overload protector 60 may be a model 3ARG11 available from the General Electric Company, Morrison, Illinois. If greater details of the operation and/or construction of protector device 60 is desired, reference may be had to U.S. Pat. No. 3,361,890 issued on Jan. 2, 1968 to Donald H. Stoll which is also specifically incorporated herein by reference. Further, it may be noted that because PTCR 45 provides protection for auxiliary winding means 29 by limiting the current flow to it, overload protector device 60 may be designed or rated specifically for the protection of only main winding means 27; therefore, in this manner, the application of the protector device is believed to be simplified so as to eliminate compromises which might otherwise be made in order to provide current overload protection for the auxiliary winding means as well as the main winding means.

In the operation of prime mover 11, switch 31 is manually closed thereby to make circuit means 33 across the prime mover placing it in its starting mode so that main winding means 27 and auxiliary winding means 29 may be initially excited. Current flows in circuit means 33 from line terminal L1 to parallel circuit branches 35, 37, and with respect to circuit branch 35, current passes through coil 39 of relay device 41, terminal 59 of prime mover 11, its main winding means 27 and terminal 55 to line terminal L2. Of course, upon the initial excitation of main winding means 27, a generally high current draw is occasioned through circuit branch 35, and when such current draw excites coil 39 of relay device to the predetermined pick-up value therefor, the coil magnetically effects the movement of its associated contact means 43 from its at-rest or open position thereof to its closed position in making engagement so as to complete or make circuit branch 37 across line terminals L1, L2 generally simultaneously with the completion of branch circuit 35 across the line terminals, as previously described. When relay device 41 is so energized to effect the closure of its contact means 43, current flows in circuit branch 37 through the closed relay contact means 43, PTCR 45 of starting device 51, terminal 57 of prime mover 11, its auxiliary winding means 29 and terminal 55 to line terminal L2. In this manner, prime mover 11 is energized in its starting mode across line terminals L1, L2 so as to initially effect the generally simultaneous excitation of both main winding means 27 and auxiliary winding means 29 of the prime mover, and upon such energization of the prime mover, rotatable assembly 49 is rotatably driven in stationary assembly 47 due to the magnetic coupling relation between the rotatable assembly and both the main winding means and the auxiliary winding means.

During the starting time period of prime mover 11, i.e. the period of time consumed in bringing rotatable assembly 49 from a stand-still position to its preselected speed, PTCR 45 is energized by the current draw of auxiliary winding means 29 through circuit branch 37, and generally about the time rotatable assembly 49 attains its preselected speed, i.e., generally at the end of the starting time period of the prime mover, the PTCR becomes heated to its anomaly temperature with the accompanying increase in the resistance thereof so as to inhibit current flow to auxiliary winding means 29 of the prime mover. In this manner, the inhibition of current flow by PTCR 45 generally as rotatable assembly 49 attains its preselected speed renders auxiliary winding means 29 generally ineffective in winding circuit 53 of prime mover 11. Thereafter, prime mover 11 is energized in its running mode generally at the preselected speed across line terminals L1, L2 in response to the continued excitation of main winding means 27 in circuit relation with the line terminals.

As rotatable assembly 49 attains its preselected speed so that prime mover 11 is translated from its starting mode to its running mode, as described above, an appreciable reduction of the current draw by main winding means 27 is occasioned. Of course, the occurrence of this current draw reduction, i.e. the aforementioned preselected condition, in circuit branch 35 is, in effect, sensed by coil 39 of relay device 41, and when the current draw is so reduced to the predetermined drop-out value of the relay device, the magnetic affect and excitation of the coil is correspondingly reduced so as to permit the reopening of its associated contact means 43. Upon the reopening of relay contact means 43, branch circuit 37 is placed in open circuit relation with respect to line terminals L1, L2, i.e., interrupted or opened thereacross, so as to obviate current flow through branch circuit 37 to starting device 51 and deenergize PTCR 45. Of course, this deenergization of PTCR 45 not only alleviates any voltage drop across it but also permits it to cool in anitcipation of a subsequent starting operation of prime mover 11.

With reference again in general to the drawings and recapitulating at least in part with respect to the foregoing, circuit means 33 in one form of the invention is adapted for connection across power source L1, L2 so as to control the energization of prime mover 11 having main winding means 27 and auxiliary winding means 29 adapted for excitation in parallel circuit relation with each other (FIGS. 1-8). Means, such as starting device 51 including PTCR 45, is coupled in series circuit relation with auxiliary winding means 29 for inhibiting the excitation thereof generally at a preselected speed of prime mover 11, and means, such as relay device 41, is operable generally in response to a preselected condition associated with the excitation of main winding means 27 for disassociating the inhibiting means or starting device from circuit relation with power source L1, L2 (FIGS. 1-8).

Figure 2:
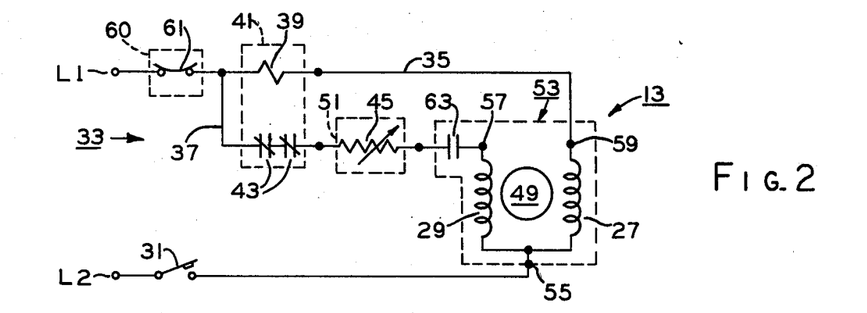

Referring now to FIG. 2, prime mover 13 is shown functioning in circuit means 33 and operated by the above described method generally in the same manner as the previously described prime mover 11 with the exception discussed hereinafter, and it is believed that prime mover 13 functioning in combination with the components of circuit means 33 attains indigenous objects and advantages features as well as meeting at least some of those set out hereinbefore.

Prime mover 13 is a capacitor start induction run type, and a start capacitor 63 is illustrated as being serially connected in circuit relation between auxiliary winding means 29 and starting device 51. If desired, start capacitor 63 may be an integral or permanent part of winding circuit 53 of prime mover 13, or alternatively the starting capacitor may be "hung" or electrically connected between prime mover terminal 57 and starting device 51 by the use of a plurality of leads having quick connect fittings, as previously mentioned. Start capacitor 63 is utilized in prime mover 13 to improve the starting torque thereof, as is known in the art, and since circuit branch 37 is opened by relay device 41 generally as prime mover 13 attains its preselected speed generally at the end of its starting mode or period, as previously discussed, the start capacitor will discharge through auxiliary winding means 29. Thus, it may be noted that the size of start capacitor 63 may be optimized with respect to prime mover 13 so as to provide maximum starting torque values therefor.

Figure 3:
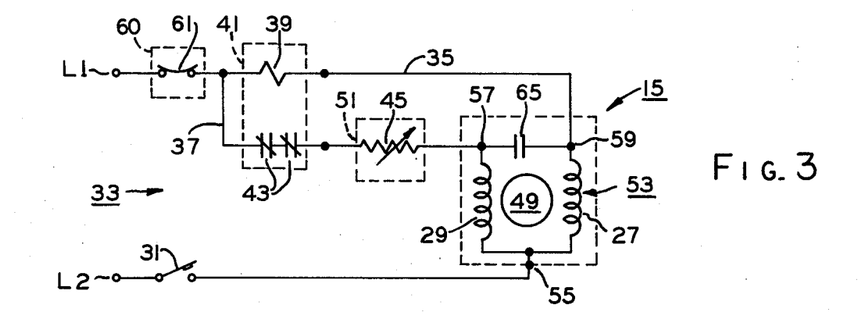

In FIG. 3, prime mover 15 is shown functioning in circuit means 33 and operated by the above described method generally in the same manner as the previously described prime mover 11 with the exceptions discussed below, and it is believed that prime mover 15 functioning in combination with components of circuit means 33 attains indigenous objects and advantageous features as well as meeting at least some of those set out hereinbefore.

Prime mover 15 is a resistance start capacitor run type, and a run capacitor 65 is connected in winding circuit 53 of the prime mover between terminals 57, 59 thereof. Of course, run capacitor 65 is provided to improve the efficiency of prime mover 15 by effecting the utilization of auxiliary winding means 27 during the running mode operation of the prime mover, as is known in the art, and since circuit branch 37 is opened by relay device 41 generally as prime mover 15 attains its preselected speed generally at the end of its starting mode or period, as previously discussed, the run capacitor will discharge through winding circuit 53 of the prime mover. Thus, it may be noted that the size of run capacitor 65 may be optimized with respect to prime mover 15 so as to provide maximum running efficiency therefor.

Figure 4:
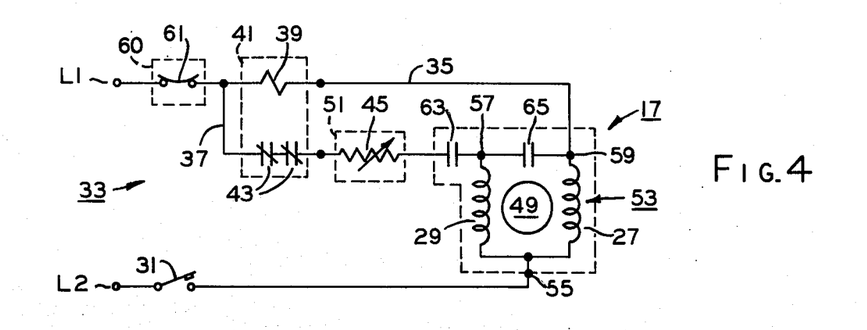
Figure 5:
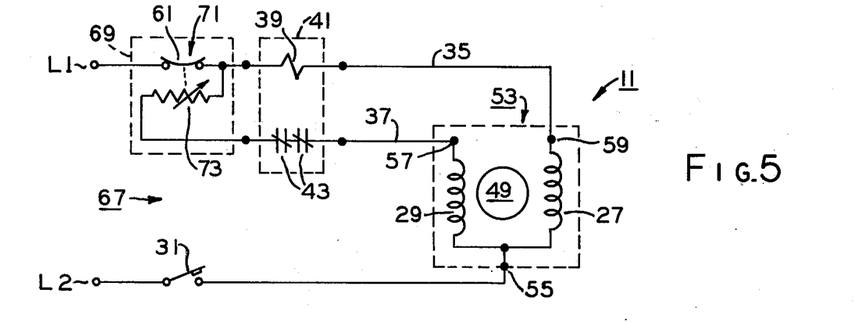
Figure 6:
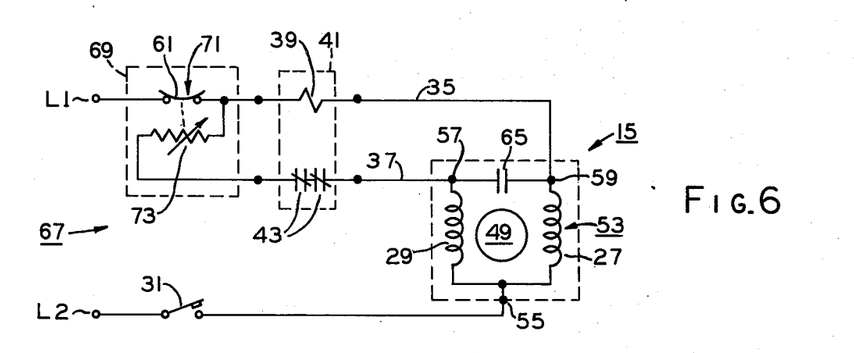
Figure 7:
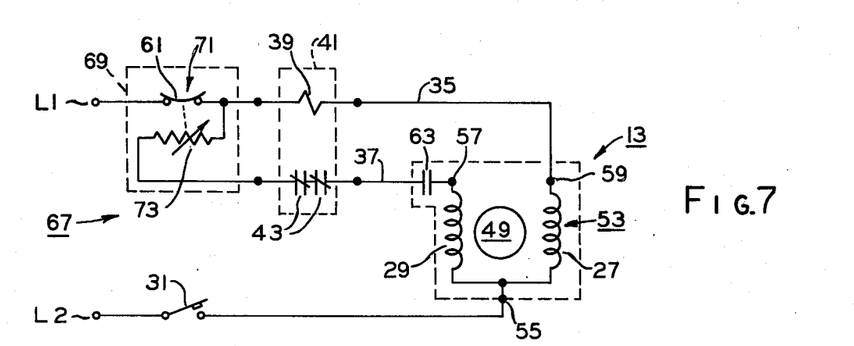
Figure 8:
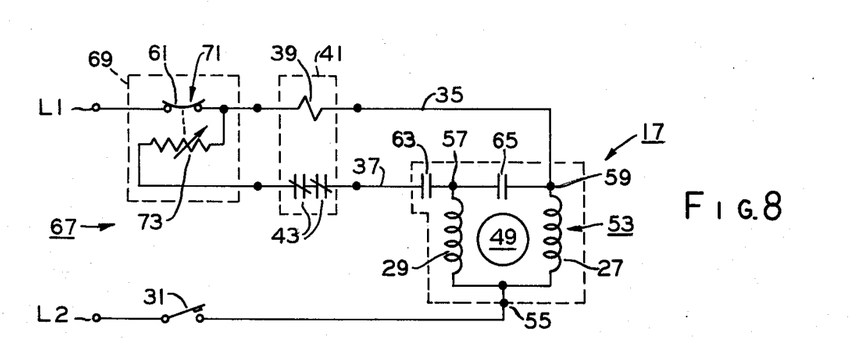

In FIG. 4, prime mover 17 is shown functioning in circuit means 33 and operating in accordance with the above described method generally in the same manner as previously described prime mover 11 with the exceptions discussed below, and it is believed that prime mover 17 functioning in combination with components of circuit means 33 attains indigenous objects and advantageous features as well as meeting at least some of those set out hereinbefore.

Prime mover 17 is a capacitor start capacitor run type. Run capacitor 65 is connected between prime mover terminals 57, 59, and start capacitor 63 is serially connected in circuit relation between starting device 51 and prime mover terminal 57. As previously mentioned, start capacitor 63 may either be an integral part or component of prime mover 17 or may be "hung" thereon by suitable electrical leads having quick connect fittings. As well known in the art, run capacitor 65 is utilized to improve running efficiency of prime mover 17 by effecting the utilization of auxiliary winding means 27 during the running mode of the prime mover, and start capacitor 63 provides increased starting torque during the starting mode of the prime mover. Of course, circuit branch 37 is opened by relay device 41 generally as prime mover 17 attains its preselected speed generally at the end of its starting mode or period, as previously discussed, and continued excitation of main winding means 27 along with auxiliary winding means 29 through capacitor 65 energizes the prime mover in its running mode. In this particular prime mover construction, start capacitor 63 will either discharge internally or through PTCR 45 when relay contact means 43 are closed in branch circuit 37, and run capacitor 65 will discharge through winding circuit 53 of prime mover 17. Thus, it may be noted that the sizes of capacitors 63, 65 may be optimized with respect to prime mover 17 not only to provide maximum starting torque but also maximum running efficiency.

Referring now to FIGS. 5-8, prime movers 11-17 are shown functioning in another circuit or circuit means 67 and operating in accordance with the above described method with the exceptions discussed below, and it is believed that prime movers 11-17 functioning in combination with components of circuit means 67 attain indigenous objects and advantageous features as well as meeting at least some of those set out hereinbefore, respectively.

Circuit means 67 in one form of the invention is provided for controlling current flow to the above discussed prime movers 11-17 and operates generally in the same manner as the previously described circuit means 33; however, in circuit means 67 a combination starter-protector device 69 is employed including an overload protector or current carrying terminal responsive switch means 71 and a PTCR 73 disposed generally closely adjacent each other in heat transfer relation. Combination starter-protector device 69 may be a Model 3ARR32 available from General Electric Company, Morrison, Illinois. Overload protector 71 is generally the same as the previously discussed overload protector 60 and is serially interconnected between power terminal L1 and circuit branches 35, 37 of circuit means 67. PTCR 73 is generally the same as the previously discussed PTCR 45 and is serially connected in circuit branch 37 with contact means 43 of relay device 41.

In the event of the occurrence of a current overload condition in circuit means 67 which may have a deleterious affect on prime movers 11-17, overload protector 71 senses such overload conditions and opens the circuit means across line terminals L1, L2 which, of course, effects the deenergization of the components of the circuit means. After a preselected period of time, overload protector 71 cools and replaces circuit means 67 across line terminals L1, L2 which, of course, reenergizes the components of the circuit means; however, if the overload condition still exists in the circuit means, then the overload protector again senses the overload condition and acts to again open the circuit means across the line terminals. So long as the overload condition exixts, overload protector 71 will be thermally cycled to open and close circuit means 67, but the length of time the thermal protector cyclically closes the circuit means is predeterminately of a generally short duration wherein the components of the circuit means are not deleteriously affected. Of course, PTCR 73 is energized during the cyclical closure of circuit means 67 by overload protector 71 under the aforementioned overload conditions, and the heat generated by the PTCR upon its energization is transferred to the thermal protector so as to increase the "off" time thereof, i.e. increase the time the thermal protector cycles the circuit means open across line terminals L1, L2 during the period of time the overload condition exists. If a more detailed discussion of the operation and/or construction of combination starter-protector device 69 is desired, reference may be had to the Lee O. Woods et al. application Ser. No. 624,381 filed Oct. 10, 1975 and the Donald H. Stoll application Ser. No. 508,457 filed Sept. 23, 1974 each of which is specifically incorporated herein by reference.

From the foregoing, it is now apparent that prime movers 11-17, a method of operating such prime movers, a method of interrupting means for inhibiting current flow therethrough, and circuit means 33, 67 are presented meeting the objects and advantageous features set out hereinbefore, as well as others. It is contemplated that changes as to the precise arrangement, shapes, details and connections of the components illustrated herein by way of disclosure, as well as the precise order of the steps of the illustrated methods, may be made by those having ordinary skill in the art without departing from the spirit of the invention or the scope thereof as set out in the claims which follow.

What I claim as new and desire to secure by Letters Patent of the United States is:

1. In a prime mover adapted for energization across a power source and having a stationary assembly, the stationary assembly including main winding means adapted for excitation upon the energization of the prime mover, auxiliary winding means arranged in parallel circuit relation with the main winding means and adapted for excitation upon the energization of the prime mover, and one of a pair of opposite terminal end portions of each of the main winding means and the auxiliary winding means being connected together and adapted for connection with the power source, a rotatable assembly associated with the stationary assembly and adapted for rotation at a preselected speed in response to magnetic coupling relation of the rotatable assembly with the main winding means and the auxiliary winding means upon the excitation thereof; the improvement comprising a current relay device including contact means connected in series circuit relation with the other of the opposite terminal end portions of the auxiliary winding means and adapted for movement between an open position and a closed position, and a coil connected in series circuit relation with the other of the opposite terminal end portions of the main winding means and operable generally for effecting the movement of said contact means to the closed position thereof upon the energization of the prime mover across the power source, and a PTCR connected in series circuit relation with said contact means and the other opposite terminal end portion of the auxiliary winding means and adapted for energization in response to the closure of said contact means when the prime mover is energized across the power source, said PTCR being initially operable upon its energization when said contact means is closed to pass current to the auxiliary winding means to effect the excitation thereof and said PTCR also being operable to inhibit the passage of the current therethrough to the auxiliary winding means generally when the rotatable assembly attains its preselected speed so that the continued excitation of at least the main winding means thereafter effects the rotation of the rotatable member at the preselected speed thereof when the prime mover is energized across the power source, said coil being responsive to the occurrence of a reduction in the current flow to the main winding means when the rotatable member is rotated at its preselected speed in response to the continued excitation of at least the main winding means so as to effect the movement of said contact means to the open position thereof in order to deenergize said PTCR.

2. A prime mover adapted for energization generally to a preselected speed therefor across a power source, the prime mover comprising at least a pair of winding means for excitation to effect the energization of the prime mover generally to the preselected speed when it is energized across the power source, a PTCR associated with one of said winding means of said at least pair thereof and energized with the prime mover across the power source so as to inhibit the excitation of said one winding means generally as the prime mover attains its preselected speed, and means operable generally in response to a preselected condition associated with the excitation of the other of said winding means of said at least pair thereof and indicative of the occurrence of the preselected speed of the prime mover for effecting the deenergization of said PTCR generally as the prime mover attains its preselected speed.

3. A prime mover as set forth in claim 2 wherein said deenergization effecting means comprises contact means in circuit relation with said PTCR for movement between an open position and a closed position, said contact means being disposed in the open position to effect the deenergization of said PTCR.

4. A prime mover as set forth in claim 2 wherein said deenergization effecting means comprises means associated with said other winding means for generally conjoint excitation therewith and operable in response to the preselected condition indicative of the occurrence of the preselected speed of the prime mover to initiate the operation of said deenergization effecting means causing the deenergization of said PTCR.

5. A prime mover as set forth in claim 2 wherein said deenergization effecting means comprises a relay device having contact means associated with said PTCR for movement between open and closed positions, and coil means associated with said other winding means for effecting the movement of said contact means between the open and closed positions thereof, said coil means being operable generally in response to the preselected condition indicative of the occurrence of the preselected speed of the prime mover to effect the movement of said contact means to the open position thereof and thereby cause the deenergization of said PTCR.

6. A prime mover as set forth in claim 2 further comprising a device for protecting said at least winding means pair in the event of the occurrence of a current overload condition including switch means for effecting open circuit relation between the power source and the prime mover upon the occurrence of the current overload condition, said PTCR being disposed in said device in spaced relation with said switch means so as to transfer heat thereto when said PTCR is energized.

7. In combination, a prime mover adapted to energization in both a starting mode and a subsequent running mode across a power source and a PTCR energized with the prime mover so as to predeterminately terminate the starting mode energization of the prime mover; the improvement comprising means energized with the prime mover and operable generally in response to a preselected condition indicative of the occurrence of the running mode energization of the prime mover for interrupting the energization of the PTCR generally as the prime mover attains its running mode energization.

8. The prime mover as set forth in claim 7 wherein said interrupting means comprises a relay device.

9. The prime mover as set forth in claim 7 wherein the preselected condition is a drop in the current draw of the prime mover generally as it attains its running mode energization.

10. The prime mover as set forth in claim 7 wherein the improvement further comprises thermal responsive switch means operable generally for interrupting the energization of the prime mover across the power source in the event of the occurrence of a current overload condition, the PTCR being disposed adjacent said switch means so as to transfer heat thereto when the PTCR is energized.

11. A prime mover comprising at least a main winding means and at least an auxiliary winding means connected in circuit relation and adapted for excitation to effect the energization of the prime mover to a preselected speed therefor, a PTCR connected in circuit relation with said at least auxiliary winding means and energized in response to current applied thereto so as to inhibit the excitation of said at least auxiliary winding means generally as the preselected speed of the prime mover is attained, and means connected in circuit relation with said at least main winding means and said PTCR and operable generally in response to a preselected condition associated with the excitation of said at least main winding means and indicative of the occurrence of the preselected speed of the prime mover for interrupting the energization of said PTCR generally when the prime mover attains its preselected speed.

12. A prime mover as set forth in claim 11 wherein said interrupting means comprises a relay device having coil means connected in the circuit relation with said at least main winding means, and contact means connected in the circuit relation with said PTCR, said coil means being operable in response to the preselected condition to effect actuation of said contact means to a position in open circuit relation with said PTCR so as to interrupt the energization thereof.

13. A prime mover as set forth in claim 11 further comprising a device including switch means for protecting at least one of said at least main winding means and said at least auxiliary winding means in the event of the occurrence of a current overload condition in the prime mover upon the energization thereof, said PTCR being being associated in heat transfer relation with said switch means.

14. A prime mover adapted for energization across a power source to a preselected speed therefor during a starting mode of the prime mover and thereafter energized generally at the preselected speed in a running mode, the prime mover comprising a winding circuit having a main winding means and an auxiliary winding means for excitation during the starting mode energization of the prime mover; a combination starter-protector device including a current carrying thermal responsive switch means for association in circuit relation with the power source and said winding circuit and operable in the event of a predetermined current overload condition for interrupting the energization of the prime mover across the power source, and a PTCR for association in circuit relation through said switch means with the power source and said auxiliary winding means and disposed in heat transfer relation adjacent said switch means, said PTCR being energized so as to generally interrupt current flow therethrough to said auxiliary winding means generally as the prime mover attains its preselected speed in order to terminate the starting mode energization of the prime mover and the heat generated by said PTCR in response to its energization being transferred at least in part to said switch means; and means operable generally in response to a preselected condition occurring upon the continued excitation of at least said main winding means during the running mode energization of the prime mover generally at its preselected speed for placing said PTCR in open circuit relation with respect to the power source and effecting the deenergization of said PTCR.

15. A method of interrupting the operation of a PTCR so as to inhibit current flow therethrough to one of at least a pair of winding means of a winding circuit in a prime mover generally upon the energization thereof to a preselected speed in response to the excitation of the winding circuit across a power source, the method comprising sensing a preselected condition in the winding circuit generally indicative of the occurrence of the preselected speed of the prime mover and opening a circuit between the power source and the one winding means so as to cause the deenergization of the PTCR and effect the interruption of the operation of the PTCR generally as the prime mover is energized to its preselected speed.

16. The method as set forth in claim 15 comprising the additional step of continuing the excitation of at least one of the one winding means and the other of the winding means of the at least pair thereof to energize the prime mover generally at its preselected speed.

17. A method of interrupting the operation of a PTCR acting to inhibit current flow therethrough to one of a pair of winding means in a winding circuit of a prime mover generally upon the energization thereof to a preselected speed in response to the excitation of the winding circuit across a power source, the method comprising sensing a preselected condition upon the occurrence thereof in the winding circuit generally when the prime mover attains its preselected speed and placing the PTCR in open circuit relation with respect to the power source so that the prime mover is energized across the power source in response to the continued excitation of at least the other of the winding means of the pair thereof.

18. A method of operating a prime mover having at least a pair of winding means adapted for excitation across a power source during a starting mode energization of the prime mover and with at least one of the winding means of the at least winding means pair adapted for excitation across the power source during a running mode energization of the prime mover, the method comprising the steps of:
 (a) energizing a means for inhibiting current flow therethrough to the other of the winding means of the at least winding means pair so as to terminate the starting mode energization of the prime mover and effecting the continued excitation of the at least one winding means across the power source during the running mode energization of the prime mover; and
 (b) placing the inhibiting means in open circuit relation with respect to the power source during the running mode energization of the prime mover to effect the deenergization of the inhibiting means.

19. The method as set forth in claim 18 wherein the placing step includes sensing a preselected condition upon the occurrence thereof associated with the excitation of the at least one winding means and interrupting the current flow to the inhibiting means in response to the occurrence of the preselected condition.

20. The method as set forth in claim 18 wherein the inhibiting means comprises a PTCR.

21. The method as set forth in claim 18 wherein the placing step comprises subjecting a coil means of a relay device to a preselected condition occurring with respect to the excitation of the at least one winding means during the running mode energization of the prime mover so that the coil means causes the movement of a contact means of the relay device to a position effecting the open circuit relation of the inhibiting means with respect to the power source when the preselected condition occurs.

22. The method as set forth in claim 19 wherein the preselected condition is a drop in the current draw of the at least one winding means generally as the prime mover attains its running mode energization.

23. A method of operating a prime mover having main winding means and auxiliary winding means for respective connection in a pair of parallel connected circuit branches across a power source, the method comprising the steps of:
(a) exciting the main winding means and the auxiliary winding means across the power source;
(b) energizing a means for inhibiting current flow therethrough in one of the circuit branches to the auxiliary winding means and continuing the excitation of the main winding means through the other of the circuit branches; and
(c) opening the one circuit branch to effect the deenergization of the inhibiting means.

24. The method as set forth in claim 23 wherein the opening step comprises moving a contact means in the one circuit branch to an open position therein upon the sensing of a preselected condition in the other circuit branch which occurs during the energizing and continuing step.

25. The method as set forth in claim 23 wherein the opening step comprises partially deenergizing a coil means of a relay device connected in the other circuit branch generally as the excitation of the main winding means is continued in the energizing and continuing step and moving a contact means of the relay device connected in the one circuit branch to an open position therein in response to the at least partial deenergization of the coil means.

26. The method as set forth in claim 23 wherein the inhibiting means comprises a PTCR.

27. The method as set forth in claim 23 comprising the additional step of effecting the deexcitation of at least one of the main winding means and the auxiliary winding means in the event of the occurrence of a predetermined current overload condition across the power source.

28. The method as set forth in claim 23 comprising the additional step of operating a device for effecting the deexcitation of at least one of the main winding means and the auxiliary winding means across the power source in the event of the occurrence of a predetermined current overload condition.

29. The method as set forth in claim 28 wherein the device includes a current carrying thermal responsive switch means movable in response to the occurrence of the predetermined current overload condition to a position effecting the deexcitation of the at least one of the main winding means and the auxiliary winding means, and a PTCR comprising the inhibiting means disposed adjacent the switch means for transferring thereto heat generated by the PTCR when it is energized.

30. A method of operating a prime mover having main winding means and auxiliary winding means adapted for excitation in parallel circuit relation across a power source to effect the energization of the prime mover to a preselected speed therefor, a relay device including contact means movable between open and closed positions and associated in circuit relation with the auxiliary winding means, and coil means excited with the main winding means for effecting the actuation of the contact means between its open and closed positions, and a combination starter-protector device including a current carrying thermal responsive switch means operable generally in response to a current overload condition for effecting the deexcitation of the main winding means and the auxiliary winding means, and a PTCR disposed in heat transfer relation with the switch means and in circuit relation with the contact means and the auxiliary winding means, the method comprising the steps of:
(a) connecting the main winding means and the auxiliary winding means across the power source to effect the excitation thereof so as to energize the prime mover and generally simultaneously exciting the coil means of the relay device to effect the actuation of the contact means to the closed position thereof;
(b) energizing the PTCR to inhibit current flow therethrough to the auxiliary winding means with the contact means in the closed position generally as the prime mover attains its preselected speed;
(c) effecting a partial deexcitation of the coil means in response to a reduction in the current draw by the main winding means generally as the prime mover attains its preselected speed and causing thereby the movement of the contact means to the open position thereof placing the PTCR in open circuit relation with respect to the power source so as to deenergize the PTCR;
(d) continuing the energization of the prime mover generally at the preselected speed thereof in response to the excitation of at least the main winding means across the power source; and
(e) actuating the switch means to an open position effecting the deenergization of the prime mover with respect to the power source in the event of the occurrence of the current overload condition with the heat generated by the PTCR upon its energization being transferred to the switch means.

31. A circuit for effecting the energization of a prime mover to a preselected speed therefor across a power source, the circuit comprising a pair of parallel circuit branches adapted for connection across the power source, said prime mover including main winding means and auxiliary winding means respectively connected in said circuit branches for excitation to effect the energization of the prime mover to its preselected speed, means associated with one of said circuit branches and operable generally for inhibiting current flow therethrough to said auxiliary winding means generally as the prime mover attains its preselected speed, and means operable generally in response to a preselected condition occurring in the other of said circuit branches when the prime mover attains its preselected speed for opening said one circuit branch across the power source to interrupt the operation of said inhibiting means.

32. A circuit as set forth in claim 31 wherein said inhibiting means includes a PTCR.

33. A circuit as set forth in claim 31 wherein said opening means includes contact means connected in said one circuit branch for movement between making and breaking positions therein, said contact means being movable to the breaking position thereof to open said one circuit branch upon the occurrence of the preselected condition.

34. A circuit as set forth in claim 33 wherein said opening means further includes coil means connected in the other circuit branch for excitation with said main winding means, said coil means being responsive to the occurrence of the preselected condition to effect the movement of said contact means to the breaking position thereof.

35. A circuit as set forth in claim 31 further comprising means connected in circuit relation with both the one and other circuit branches for effecting the deenergization of said prime mover across the power source in the event of the occurrence of a predetermined current overload condition.

36. A circuit as set forth in claim 35 wherein said deenergization effecting means comprises a current carrying thermal responsive switch means movable from a position making the circuit across the power source toward a position breaking the circuit in response to the occurrence of the predetermined overload condition.

37. A circuit as set forth in claim 36 wherein said inhibiting means comprises a PTCR, said PTCR being disposed adjacent said switch means so as to transfer thereto heat generated by said PTCR upon the energization thereof in said one circuit branch.

38. A prime mover adapted for energization generally to a preselected speed therefor across a power source, the prime mover comprising at least a pair of winding means for excitation to effect the energization of the prime mover generally to the preselected speed when it is energized across the power source, means in circuit relation with one of said winding means of said at least pair thereof and the power source for inhibiting the excitation of said one winding means generally as the prime mover attains its preselected speed, and a relay device including contact means associated with said inhibiting means and operable generally for movement between open and closed positions, and coil means associated with the other of said winding means of said at least pair thereof for effecting the movement of said contact means between its open and closed positions, said coil means being operable generally in response to the occurence of a preselected condition with respect to the excitation of said other winding means to effect the movement of said contact means to the open position thereof and place said inhibiting means in open circuit relation with respect to the power source generally as the prime mover attains its preselected speed.

39. A prime mover adapted for energization generally to a preselected speed therefor across a power source, the prime mover comprising at least a pair of winding means for excitation to effect the energization of the prime mover generally to the preselected speed when it is energized across the power source, means in circuit relation with one of said winding means of said at least pair thereof and the power source for inhibiting the excitation of said one winding means generally as the prime mover attains its preselected speed, means operable generally in response to the occurrence of a preselected condition with respect to the excitation of the other of said winding means of said at least pair thereof for placing said inhibiting means in open circuit relation with the power source generally as the prime mover attains its preselected speed, and a device for protecting at least one of said one and other winding means in the event of the occurrence of a current overload condition including switch means for effecting open circuit relation between the power source and the prime mover upon the occurrence of the current overload condition, said inhibiting means being disposed in said device in spaced relation with said switch means so as to transfer heat thereto when said inhibiting means is energized.

40. In combination with a prime mover adapted for energization in both a starting mode and a running mode across a power source; a PTCR energized with the prime mover so as to predeterminately terminate the starting mode energization of the prime mover, and a relay device energized with the prime mover and operable upon the occurrence of a drop in the current draw of the prime mover generally as it attains its running mode energization for interrupting the energization of the PTCR.

41. In a prime mover adapted for energization in both a starting mode and a subsequent running mode across a power source and having means energized with the prime mover for predeterminately terminating the starting mode energization of the prime mover; the improvement comprising means energized with the prime mover and operable upon the occurrence of a preselected condition associated with the running mode energization of the prime mover for interrupting the energization of the terminating means generally as the prime mover attains its running mode energization, and thermal responsive switch means operable generally for interrupting the energization of the prime mover across the power source in the event of the occurrence of a current overload condition, the terminating means being disposed adjacent said switch means so as to transfer heat thereto when said terminating means is energized.

42. A prime mover comprising at least a main winding means and an auxiliary winding means connected in circuit relation and adapted for excitation to effect the energization of the prime mover to a preselected speed therefor, means associated with said auxiliary winding means and energized in response to current applied thereto for inhibiting the excitation of said auxiliary winding means generally as the preselected speed of the prime mover is attained, and a relay device including coil means associated in circuit relation with said main winding means, and contact means associated in circuit relation with said inhibiting means, said coil means being operable generally in response to a preselected condition with respect to the excitation of said main winding means to effect actuation of said contact means to a position in open circuit relation with said inhibiting means so as to interrupt the energization thereof generally as the prime mover attains its preselected speed.

43. A prime mover adapted for energization generally to a preselected speed therefor across a power source, the prime mover comprising at least a pair of winding means for excitation to effect the energization of the prime mover generally to the preselected speed when it is energized across the power source, means associated with one of said winding means of said at least pair thereof and energized with the prime mover across the power source for inhibiting the excitation of said one winding means generally as the prime mover attains its preselected speed, and means operable generally in response to a preselected condition associated with the excitation of the other of said winding means of said at least pair thereof and generally indicative of the occurrence of the preselected speed of the prime mover for effecting the deenergization of said inhibiting means generally as the prime mover attains its preselected speed, said deenergization effecting means including contact means in circuit relation with said inhibiting means for movement between an open position and a closed position, said contact means being disposed in the open position thereof to effect the deenergization of said inhibiting means.

44. A prime mover adapted for energization generally to a preselected speed therefor across a power source, the prime mover comprising at least a pair of winding means for excitation to effect the energization of the prime mover generally to the preselected speed when it is energized across the power source, means associated with one of said winding means of said at least pair thereof and energized with the prime mover across the power source for inhibiting the excitation of said one winding means generally as the prime mover attains its preselected speed, and a relay device including contact means associated with said inhibiting means and operable generally for movement between open and closed positions, and coil means associated with said other winding means for effecting the movement of said contact means between the open and closed positions thereof, said coil means being operable generally in response to a preselected condition indicative of the occurrence of the preselected speed of the prime mover to effect the movement of said contact means to the open position thereof and thereby cause the deenergization of said inhibiting means.

45. A prime mover adapted for energization generally to a preselected speed therefor across a power source, the prime mover comprising at least a pair of winding means for excitation to effect the energization of the prime mover generally to the preselected speed when it is energized across the power source, means associated with one of said winding means of said at least pair thereof and energized with the prime mover across the power source for inhibiting the excitation of said one winding means generally as the prime mover attains its preselected speed, means operable generally in response to a preselected condition associated with the excitation of the other of said winding means of said at least pair thereof and indicative of the occurrence of the preselected speed of the prime mover for effecting the deenergization of said inhibiting means generally as the prime mover attains its preselected speed, and a device for protecting said at least winding means pair in the event of the occurrence of an overload condition including switch means for effecting an open circuit relation between the power source and the prime mover upon the occurrence of the current overload condition, said inhibiting means being disposed in said device in spaced relation with said switch means so as to transfer heat thereto when said inhibiting means is energized.

46. In combination with a prime mover adapted for energization in both a starting mode and a running mode across a power source, thermal responsive switch means operable generally for interrupting the energization of the prime mover across the power source in the event of the occurrence of a current overload condition, and means energized with the prime mover for predeterminately terminating the starting mode energization of the prime mover and disposed adjacent the switch means so as to transfer heat thereto when energized; the improvement comprising means energized with the prime mover and operable generally in response to a preselected condition indicative of the occurrence of the running mode energization of the prime mover for interrupting the energization of the terminating means generally as the prime mover attains its running mode energization.

* * * * *

UNITED STATES PATENT AND TRADEMARK OFFICE
CERTIFICATE OF CORRECTION

PATENT NO. : 4,161,681
DATED : July 17, 1979
INVENTOR(S) : William C. Rathje

It is certified that error appears in the above–identified patent and that said Letters Patent are hereby corrected as shown below:

Col. 4, line 21, delete "efecting" and insert --effecting--.
Col. 10, line 62, delete "advantages" and insert --advantageous--.
Col. 12, line 26, delete "terminal" and insert --thermal--.
Col. 14, line 56, delete "to" and insert --for--.

Signed and Sealed this

Eighteenth Day of December 1979

[SEAL]

Attest:

SIDNEY A. DIAMOND

Attesting Officer

Commissioner of Patents and Trademarks